United States Patent
Miller et al.

(10) Patent No.: US 9,410,556 B2
(45) Date of Patent: Aug. 9, 2016

(54) RING SEAL MIDPLATE

(75) Inventors: Jonathan Logan Miller, Ware, MA (US); Alexander J. Maret, Middletown, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 934 days.

(21) Appl. No.: 13/493,629

(22) Filed: Jun. 11, 2012

(65) Prior Publication Data

US 2013/0330171 A1  Dec. 12, 2013

(51) Int. Cl.
| | |
|---|---|
| *F04D 29/10* | (2006.01) |
| *F04D 29/12* | (2006.01) |
| *F16J 15/44* | (2006.01) |
| *F01D 11/00* | (2006.01) |
| *F01D 25/18* | (2006.01) |
| *F16J 15/34* | (2006.01) |

(52) U.S. Cl.
CPC ............ *F04D 29/122* (2013.01); *F01D 11/001* (2013.01); *F01D 11/003* (2013.01); *F01D 25/183* (2013.01); *F16J 15/441* (2013.01)

(58) Field of Classification Search
CPC ..... F01D 11/003; F01D 25/18; F01D 25/183; F01D 25/186; F04D 29/08; F04D 29/083; F04D 29/10; F04D 29/102; F04D 29/12; F04D 29/122; F16J 15/34; F16J 15/441; F05D 2240/55; F05D 2260/98
USPC .................. 415/110, 111, 113, 170.1, 174.2, 415/229–231; 416/174
See application file for complete search history.

(56) References Cited

U.S. PATENT DOCUMENTS

| | | | |
|---|---|---|---|
| 2,921,805 A | 1/1960 | Shevchenko | |
| 3,743,303 A | 7/1973 | Pope | |
| 3,887,198 A | 6/1975 | McClure et al. | |
| 4,754,984 A | 7/1988 | Keba | |
| 4,871,297 A * | 10/1989 | Boes et al. ..................... | 277/406 |
| 4,942,059 A * | 7/1990 | Wilson .......................... | 427/596 |
| 2005/0087933 A1 | 4/2005 | Gittler | |

(Continued)

FOREIGN PATENT DOCUMENTS

| | | |
|---|---|---|
| EP | 2341218 A2 | 7/2011 |
| FR | 2185062 A5 | 12/1973 |
| FR | 2602847 A1 | 2/1988 |

OTHER PUBLICATIONS

Extended European Search Report for European Application No. 13804491.2-1751; Date of Mailing: Aug. 12, 2015; 7 pages.

(Continued)

*Primary Examiner* — Dwayne J White
*Assistant Examiner* — Alexander White
(74) *Attorney, Agent, or Firm* — Cantor Colburn LLP

(57) ABSTRACT

A seal assembly for a rotary machine which includes a rotor assembly having a rotatable rotor shaft is disclosed. The seal assembly may comprise a spacer, a seal plate, a ring seal, and a ring seal midplate. The spacer, the seal plate, and the ring seal midplate may be rotatable with the shaft and extend outwardly from the shaft. The ring seal is free and provides a seal for a bearing compartment of the rotary machine. The ring seal midplate is not attached to the spacer or the seal plate during a hardface process which is applied to any component of the seal assembly. The ring seal midplate may be longitudinally located between the spacer and the seal plate and be radially spaced between the ring seal and the shaft.

20 Claims, 6 Drawing Sheets

(56) References Cited

U.S. PATENT DOCUMENTS

2008/0272553 A1    11/2008    Awtar et al.
2012/0043725 A1*    2/2012    Jahn et al. .................... 277/306

OTHER PUBLICATIONS

French Patent No. 2185062; Date of Publication: Dec. 28, 1973; English Description; 6 pages.

French Patent No. 2602847; Date of Publication: Feb. 19, 1988; Abstract Only, 1 page.

International Search Report for International Application No. PCT/US2013/035452; Date of Mailing: Jun. 28, 2013; 2 pages.

Written Opinion of the International Searching Authority for International Application No. PCT/US2013/035452; Date of Mailing: Jun. 28, 2013, 3 pages.

* cited by examiner

RING SEAL MIDPLATE

FIELD OF THE DISCLOSURE

The present disclosure relates generally to the seal assembly for a rotary machine and, particularly, relates to a seal of a specific geometry.

BACKGROUND OF THE DISCLOSURE

An axial flow rotary machine, such as a gas turbine engine for an aircraft, communicates hot working fluids through various sections of the machine, and includes a rotor assembly in addition to a plurality of bearing compartments. Each bearing compartment has at least one bearing for supporting the rotating shaft of the rotor assembly. The bearing in the bearing compartment is supplied with a lubricating fluid such as oil, for lubricating its surfaces. A seal assembly extends between the rotating shaft and the bearing compartment to restrict or minimize the leakage of oil from the bearing compartment and the leakage of hot working fluids into the bearing compartment.

A typical seal assembly includes a ring seal, a ring seal outer housing liner, a seal plate and a spacer. Both the seal plate and the spacer rotate together with the rotating shaft and the housing liner is static, while the ring seal is free. The ring seal locates in-between the seal plate and the spacer. The ring seal forms sealing surfaces against the seal plate and the ring seal housing liner, the latter of which encloses the seal assembly.

Current ring seals utilize the outer diameter (OD) of an extension feature on either the spacer or the seal plate to prevent the ring seal element from shifting eccentric to the centerline of the shaft during assembly. This extension feature is radially underneath the ring seal, longitudinally in-between the spacer and the seal plate, and, physically attached to either the spacer or the seal plate.

Advanced, high-performance engines require improved performance from ring seals of the main shaft bearing compartment in addition to meeting more aggressive metrics in cost, weight and reliability for the sealing assembly. In addition, recent engine programs have needed to apply hardface coatings on ring seal contacting surfaces to improve wear resistance.

Such hardface coating requirements might include ring seal contacting surfaces on the ring seal outer housing liner, the rotating spacer and the rotating seal plate. Moreover, recent engine designs have been more aggressive on gapping or physical space/geometry constraints to improve performance. The combination of these challenges has created difficulty when manufacturing the spacer and the seal plate. Specifically, the radial location of the extension feature OD on spacer/seal plate creates a geometry constraint and disadvantageous situation for hardface spray processes. The extension feature OD of the spacer/seal plate is in close proximity to the inner diameter (ID) of the hardface region. As a result, hardface spray processes produced quality defects near the ID of the hardface region. Such defects have impacted and will impact part quality, cost metrics, and part delivery metrics since extra labor and time have to be spent on inspection, removal and repair. It would therefore be beneficial if a solution is found to solve this problem and satisfy the hardface coating and part geometry requirement.

SUMMARY OF THE DISCLOSURE

In accordance with one aspect of the present disclosure, a seal assembly for a rotary machine which includes a rotor assembly having a rotatable rotor shaft is disclosed. The seal assembly may comprise a spacer which is rotatable with the shaft and extends circumferentially about and radially outward from the shaft; a seal plate which is rotatable with the shaft and extends circumferentially about and radially outward from the shaft; a ring seal which is free and which is longitudinally located between the spacer and the seal plate and radially spaced between a stationary housing liner and the shaft; and a ring seal midplate which is rotatable with the shaft and extends circumferentially about and radially outward from the shaft. The ring seal provides a seal between the rotating and static components of the bearing compartment. The ring seal might float in reference to the rotating shaft. The ring seal might abut a surface of the seal plate at a radially extending seal plate region thereof and might slidably engage the seal plate. The ring seal might abut a surface of the housing liner at a circumferentially extending housing liner region thereof and might slidably engage the housing liner. The ring seal midplate is not attached to the spacer or the seal plate during the hardface process. The ring seal midplate is longitudinally located between the spacer and the seal plate and, is radially spaced between the ring seal and the shaft.

In a refinement, the seal plate region which is on the seal plate is hardface coated.

In another refinement, the seal plate is hardface coated before being attached to the shaft.

In another refinement, a seal plate-facing surface of the ring seal parallels the seal plate region of the seal plate.

In another refinement, the housing liner region which is on the housing liner is hardface coated.

In another refinement, the housing liner is hardface coated before being attached to the bearing compartment.

In another refinement, a spacer region which is on the spacer facing the ring seal is hardface coated.

In another refinement, the spacer is hardface coated before being attached to the shaft.

In another refinement, a spacer-facing surface of the ring seal which abuts the spacer parallels the spacer region of the spacer.

In another refinement, there is a circumferentially extending cavity between the spacer and the ring seal.

In another refinement, the shaft has a centerline. The ring seal midplate has an outer diameter which sets an allowable eccentricity of the ring seal with respect to the centerline during installation of the seal assembly.

In still another refinement, after the hardface process for components of the seal assembly is completed, the ring seal midplate is attached to the seal plate or the spacer, or both the seal plate and the spacer.

In accordance with another aspect of the present disclosure, a rotary machine which includes a rotor assembly having a rotatable rotor shaft, a seal assembly is disclosed. The seal assembly may comprise a spacer which is rotatable with the shaft and extends circumferentially about and radially outward from the shaft; a seal plate which is rotatable with the shaft and extends circumferentially about and radially outward from the shaft; a ring seal which is free and which is longitudinally located between the spacer and the seal plate and radially spaced between a stationary housing liner and the shaft; and a ring seal midplate which is rotatable with the shaft and extends circumferentially about and radially outward from the shaft. The ring seal provides a seal between the rotating and static components of the bearing compartment. The ring seal might float in reference to the rotating shaft. The ring seal might abut a surface of the seal plate at a radially extending seal plate region thereof and might slidably engage the seal plate. The ring seal might abut a surface of the housing liner at a circumferentially extending housing liner region thereof and might slidably engage the housing liner. The ring seal midplate is not attached to the spacer or the seal plate during a hardface process which is applied to any component of the seal assembly. The ring seal midplate is longitudinally located between the spacer and the seal plate and, is radially spaced between the ring seal and the shaft.

In a refinement, the seal plate region which is on the seal plate of the rotary machine is hardface coated.

In another refinement, the seal plate of the rotary machine is hardface coated before being attached to the shaft.

In another refinement, the housing liner region which is on the housing liner of the rotary machine is hardface coated.

In another refinement, the housing liner of the rotary machine is hardface coated before being attached to the bearing compartment.

In another refinement, a spacer region which is on the spacer of the rotary machine facing the ring seal is hardface coated.

In still another refinement, the spacer of the rotary machine is hardface coated before being attached to the shaft.

Further forms, embodiments, features, advantages, benefits, and aspects of the present disclosure will become more readily apparent from the following drawings and descriptions provided herein.

Before proceeding with the detailed description, it is to be appreciated that the following detailed description is merely exemplary in nature and is not intended to limit the invention or the application and uses thereof. In this regard, it is to be additionally appreciated that the described embodiment is not limited to use in conjunction with a particular type of rotary machine. Hence, although the present disclosure is, for convenience of explanation, depicted and described as shown in certain illustrative embodiments, it will be appreciated that it can be implemented in various other types of embodiments and equivalents, and in various other systems and environments.

DETAILED DESCRIPTION OF THE DISCLOSURE

Figure 1:
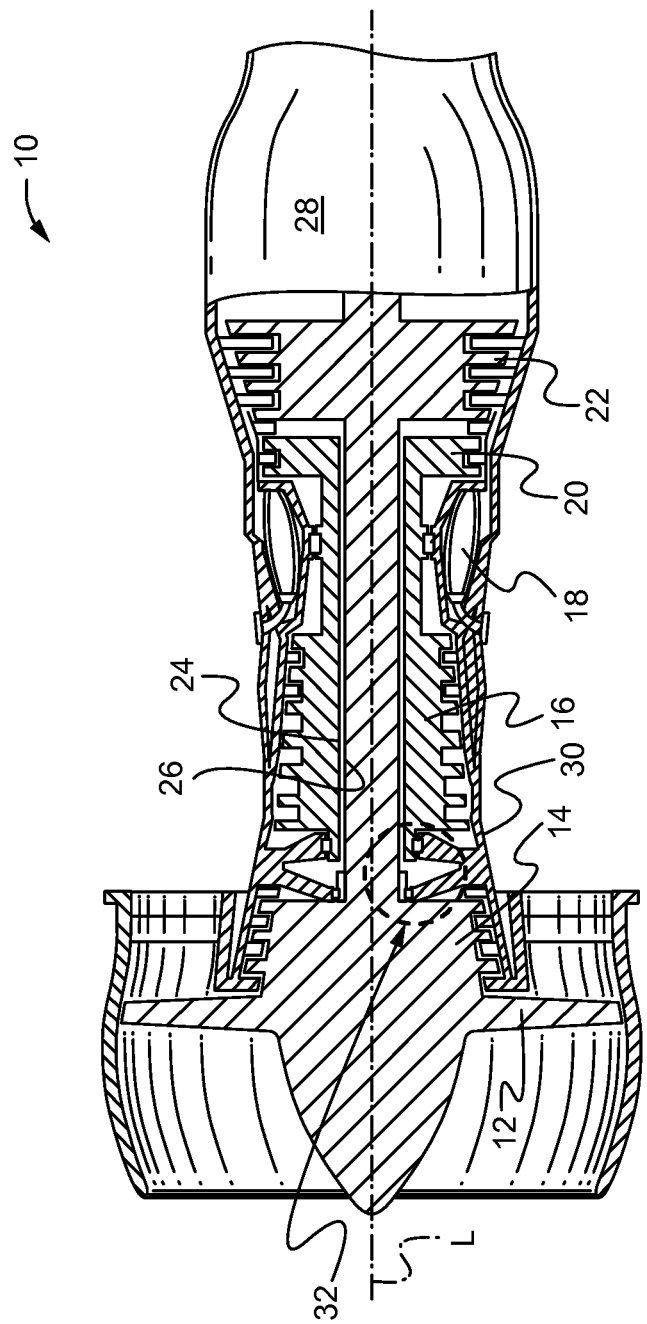
FIG. 1 is a partial cross-sectional view of a gas turbine engine in accordance with the teachings of this disclosure.

Referring now to the drawings, FIG. 1 depicts selected portions of an exemplary rotary machine 10, such as a gas turbine engine, for example. In this example, the rotary machine 10 includes a fan section 12, a low pressure compressor 14, a high pressure compressor 16, a combustor 18, a high pressure turbine 20 and a low pressure turbine 22 each disposed coaxially about an engine centerline axis L. During an operation, fluid is pressurized in the compressors 14 and 16, and mixed with fuel in the combustor 18 to generate hot fluids. The hot fluids flow through the high and low pressure turbines 20, 22, which extract energy from the hot fluids. The high pressure turbine 20 powers the high pressure compressor 16 through a high speed rotor shaft 24 and the low pressure turbine 22 powers the fan section 12 and the low pressure compressor 14 through a low speed rotor shaft 26. Although FIG. 1 illustrates a two spool gas turbine architecture, the invention is not limited to the two spool actual gas turbine architecture described herein and may be used with other architectures, such as a single spool actual design, a three spool actual design and other architectures.

Core exhaust gases are discharged from the core engine through a core exhaust nozzle 28. An annular, non-rotatable case 30 supports the high speed rotor shaft 24 and the low speed rotor shaft 26. The bearing compartment 32 comprises both a seal assembly (not shown) and at least one bearing (not shown). The seal assembly is used to restrict/minimize high pressure fluid from entering the bearing compartment 32 that operates at a low pressure. In addition, the seal assembly minimizes the risk for oil, which lubricates and cools the bearing compartment 32, to leak out of the bearing compartment 32. Although FIG. 1 is shown and described herein for a gas turbine engine with a seal assembly, it should be understood that other rotational assemblies would benefit from the seal assembly including, but not limited to, pumps, compressors, agitators, etc.

Figure 2:
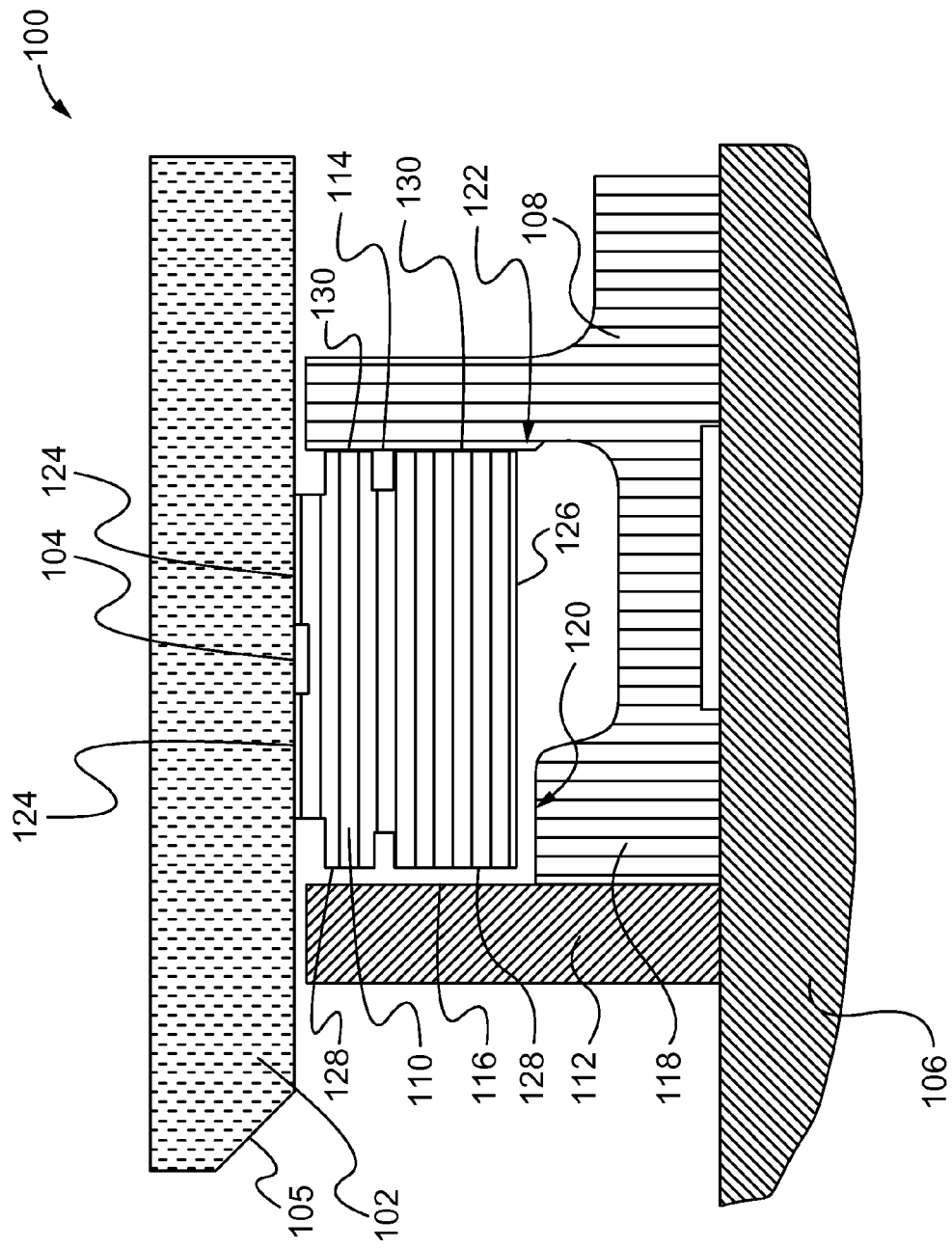
FIG. 2 is a partial longitudinal sectional view of a typical prior art seal assembly with an extension feature on a seal plate.

Turning now to FIG. 2, which shows a typical prior art seal assembly 100 for a rotary machine. The conventional seal assembly 100 has an annular housing liner 102 which has a circumferentially extending sealing face 104. The housing liner 102 encloses a rotating shaft 106, a seal plate 108, a ring seal 110 and a spacer 112. The seal plate 108 and the spacer 112 are attached to and rotatable with the shaft 106. The seal plate 108 has a sealing face 114. The spacer 112 has a face 116. The seal plate 108 has an extension feature 118 which has an outer diameter (OD) 120. The sealing face 114 is hardface coated with a hardface region inner diameter (ID) 122. Hardfacing is a process in which harder or tougher material is applied to a base metal. Hardfacing is an operation to extend the service life of parts.

The ring seal 110 has circumferentially extending end faces 124 and 126; and radially extending end faces 128 and 130. End faces 124 and 130 are in engagement with sealing faces 104 and 114, respectively. In the conventional seal assembly as shown in FIG. 2, OD 120 provides support to and limits the eccentricity of the ring seal 110 during the installation stage of the seal assembly. However, the radial proximity of OD 120 of the extension feature 118 to ID 122 of the seal plate 108 causes problems during the process of hardface coating. This geometric constraint leads to unacceptable quality defects after the hardface spray process. Costly repair and delayed delivery due to these defects result. One possible solution to this problem might be radially lowering the extension feature 118 (relatively to ID 122) to such an extent that the OD 120 is radially distant from ID 122. However, the inventors have found that such a change could cause a larger eccentricity variance for ring seal 110 during installation because of the radially lowered position of the extension feature 118. This change would require increasing the size of the housing lead-in chamfer 105. In addition, recent engines have been more aggressive on gapping or physical space constraints which set limits for the allowable housing lead-in chamfer geometry. Spatially lowering the extension feature does not satisfy the gapping/physical space constraints.

Figure 3:
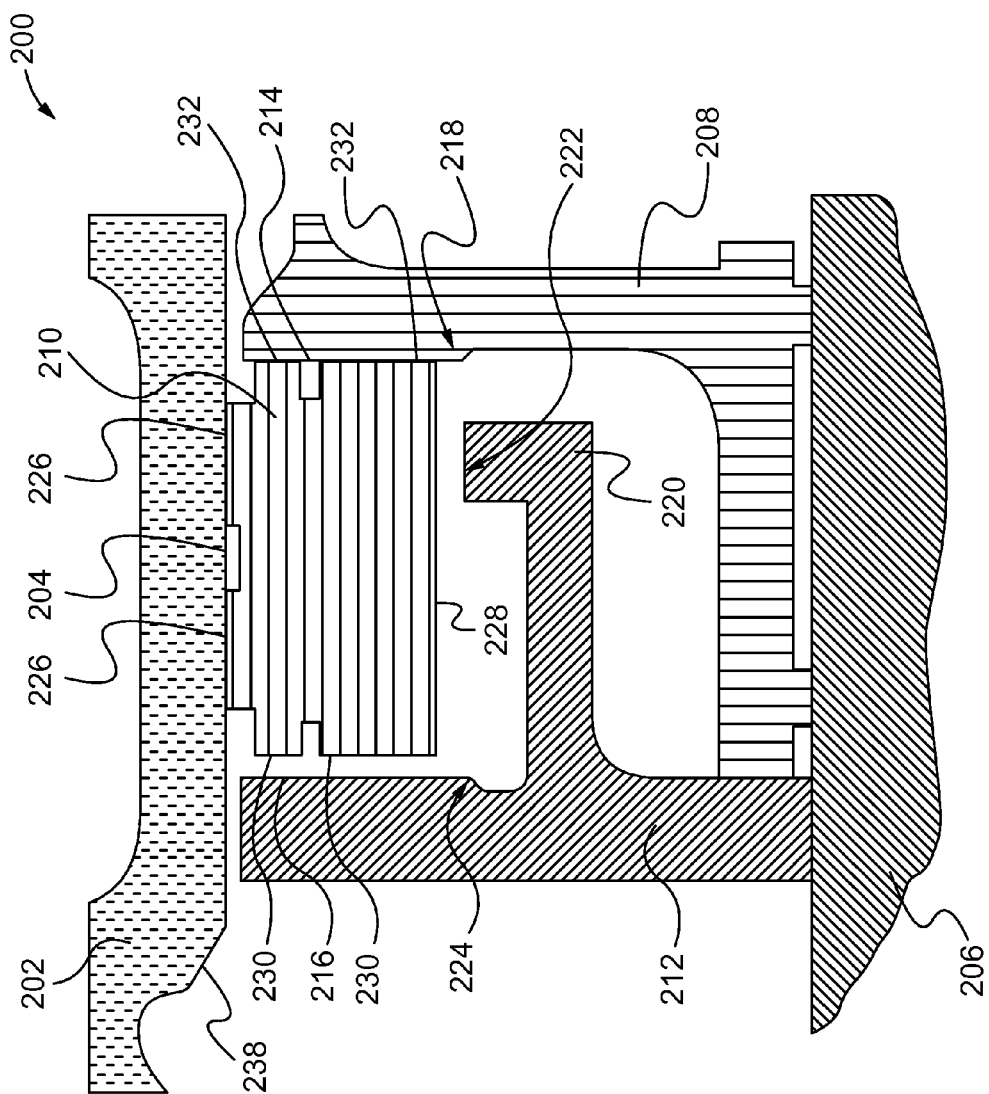
FIG. 3 is a partial longitudinal sectional view of a typical prior art seal assembly with an extension feature on a spacer.

FIG. 3 illustrates in detail another typical prior art seal assembly 200 for a rotary machine. The conventional seal assembly 200 has an annular housing liner 202 which has a circumferentially extending sealing face 204. The housing liner 202 encloses a rotating shaft 206, a seal plate 208, a ring seal 210 and a spacer 212. The seal plate 208 and the spacer 212 are attached to and rotatable with the shaft 206. The seal plate 208 has a sealing face 214 and the spacer 212 has a face 216. The sealing face 214 is hardface coated with a hardface region inner diameter (ID) 218. The spacer 212 has an extension feature 220 which has an outer diameter (OD) 222. The face 216 of the spacer 212 is also hardface coated with a hardface region inner diameter (ID) 224.

The ring seal 210 has circumferentially extending end faces 226 and 228; and radially extending end faces 230 and 232. End faces 226 and 232 are in engagement with sealing faces 204 and 214, respectively. Lead-in chamfer 238 is on the housing liner 202. In the conventional seal assembly as shown in FIG. 3, OD 222 provides support to and limits the eccentricity of the ring seal 210 during the installation stage of the seal assembly. However, the radial proximity of OD 222 of the extension feature 220 to ID 224 of the spacer 212 causes problems during the process of hardface coating on the spacer 212. Again, this geometric constraint leads to unacceptable quality defects with the hardface spray process and causes delays and rework for the manufacturing process. Furthermore, such constraint also limits the design of the lead-in chamfer 238 on the housing liner 202. Conventional modification of the spacer does not solve these problems.

Figure 4:
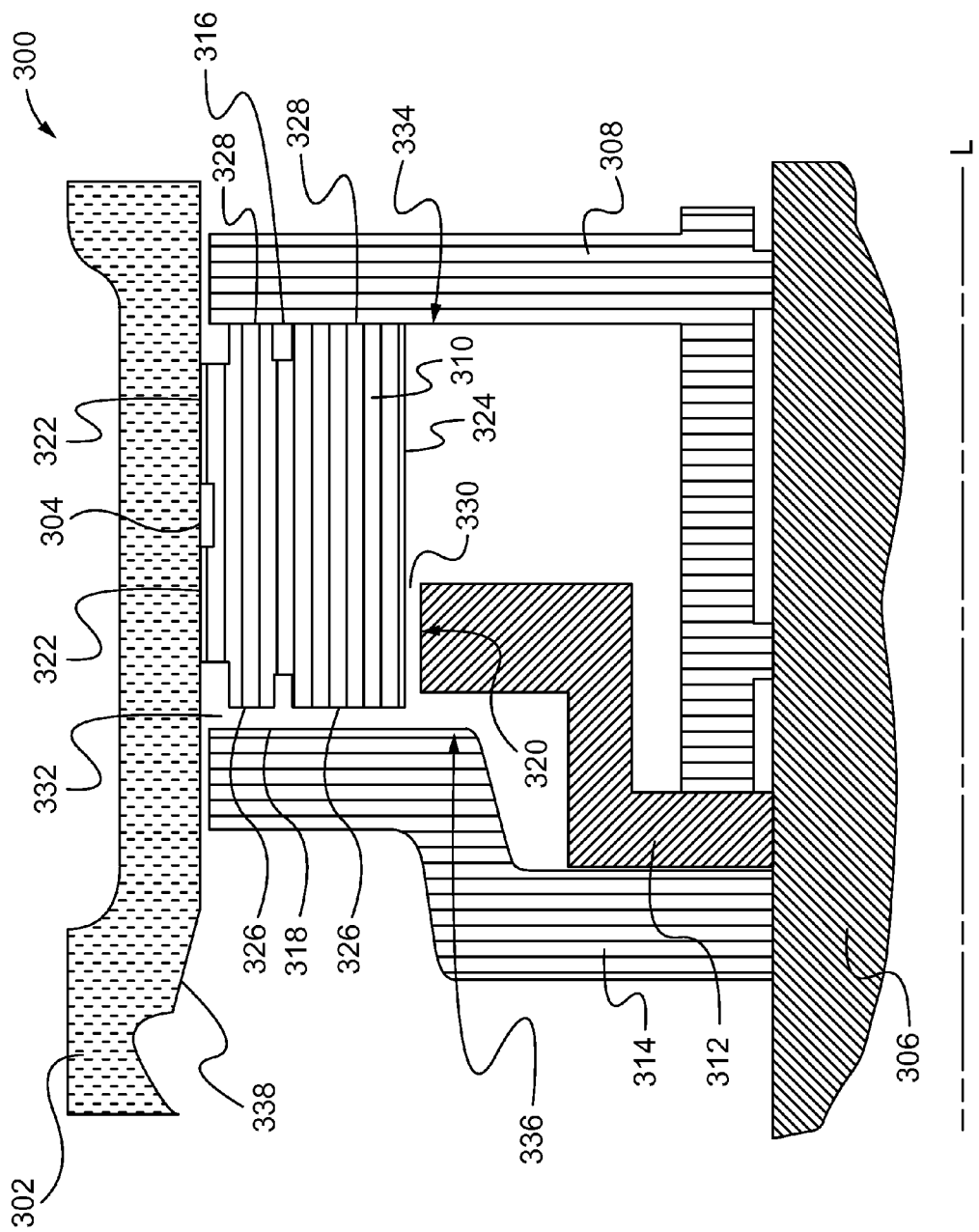
FIG. 4 is a partial longitudinal sectional view of a seal assembly constructed in accordance with the principle of the present disclosure.

Given the drawbacks of such conventional approaches, the inventors have conceived the present disclosure, one embodiment of which is shown in FIG. 4. As shown in FIG. 4, the seal assembly 300 of the present disclosure is uniquely designed to alleviate the afore-mentioned problems caused by the hardface coating requirement and provide better control of eccentricity of the ring seal to the centerline of the shaft during installation. The seal assembly 300 in operation may have an annular housing liner 302 which has a circumferentially extending sealing face 304. The housing liner 302 may enclose a rotating shaft 306, a seal plate 308, a ring seal 310, a ring seal midplate 312, and a spacer 314. The rotating shaft 306 has a rotation center line L.

The housing 302 is static. However, the seal plate 308, the ring seal midplate 312, and the spacer 314 may be attached to and rotatable with the shaft 306. In addition, the seal plate 308, the ring seal midplate 312, and the spacer 314 may extend circumferentially about and radially outward from the shaft. The ring seal 310 is free. The ring seal 310 is located within the confined space bordered by the housing 302, the seal plate 308, the ring seal midplate 312, and the spacer 314. The rotatable seal plate 308 has a radially extending sealing face 316. The rotatable spacer 314 may have a radially extending face 318, which is spaced longitudinally away from the sealing face 316. The rotatable ring seal midplate 312 may have a circumferentially extending and outwardly facing surface 320. The ring seal 310 may be made of graphitic carbon or a metallic material.

The ring seal 310 may also have a circumferentially extending housing liner-facing surface 322 and a circumferentially extending midplate-facing surface 324. The ring seal 310 may also have a radially extending spacer-facing surface 326 and seal plate-facing surface 328. The housing liner-facing surface 322 may be in slidable or static engagement with sealing face 304 of the housing liner 302, while the seal plate-facing surface 328 may be in slidable engagement with sealing face 316 of the seal plate 308. The midplate-facing surface 324 may be spaced radially from the ring seal midplate 312, leaving a circumferentially extending cavity 330 therebetween. The spacer-facing surface 326 may be spaced longitudinally from the spacer 314, leaving a circumferentially extending cavity 332 therebetween. A lead-in chamfer 338 is on the housing 302.

In one embodiment, during the installation of the seal assembly, the midplate-facing surface 324 of the ring seal 310 may be in engagement with the outwardly facing surface 320 of the ring seal midplate 312 in such a way that the ring seal 310 might use the position of the surface 320 as a reference to set and control eccentricity deviation of the ring seal 310 from the centerline L of the rotating shaft 306. The shape and dimensions of the ring seal midplate 312 might be optimized to achieve the desired allowable eccentricity of the ring seal with respect to the centerline L of the rotating shaft 306 during installation of the seal assembly. In addition, the geometry of the housing lead-in chamfer 338 on the housing 302 might be optimized and might experience less physical constraints compared with prior art due to the presence of the ring seal midplate 312.

In another embodiment, during the operation of the rotary machine, gases may be allowed to enter cavities 332 and 330. The gas pressure may push the ring seal 310 against the sealing face 304 of the housing liner 302 and the sealing face 316 of the seal plate 308. As a result, the seal assembly 300 may restrict/minimize the leakage of a lubricating fluid from a bearing compartment 32 of the machine and the entry of a working medium fluid into the bearing compartment 32.

With respect to hardfacing, the sealing face 316 may be hardface coated with a hardface region inner diameter (ID) 334. The sealing face 304 may be hardface coated as well. The face 318 may also be hardface coated with a hardface region inner diameter (ID) 336.

Figure 5:
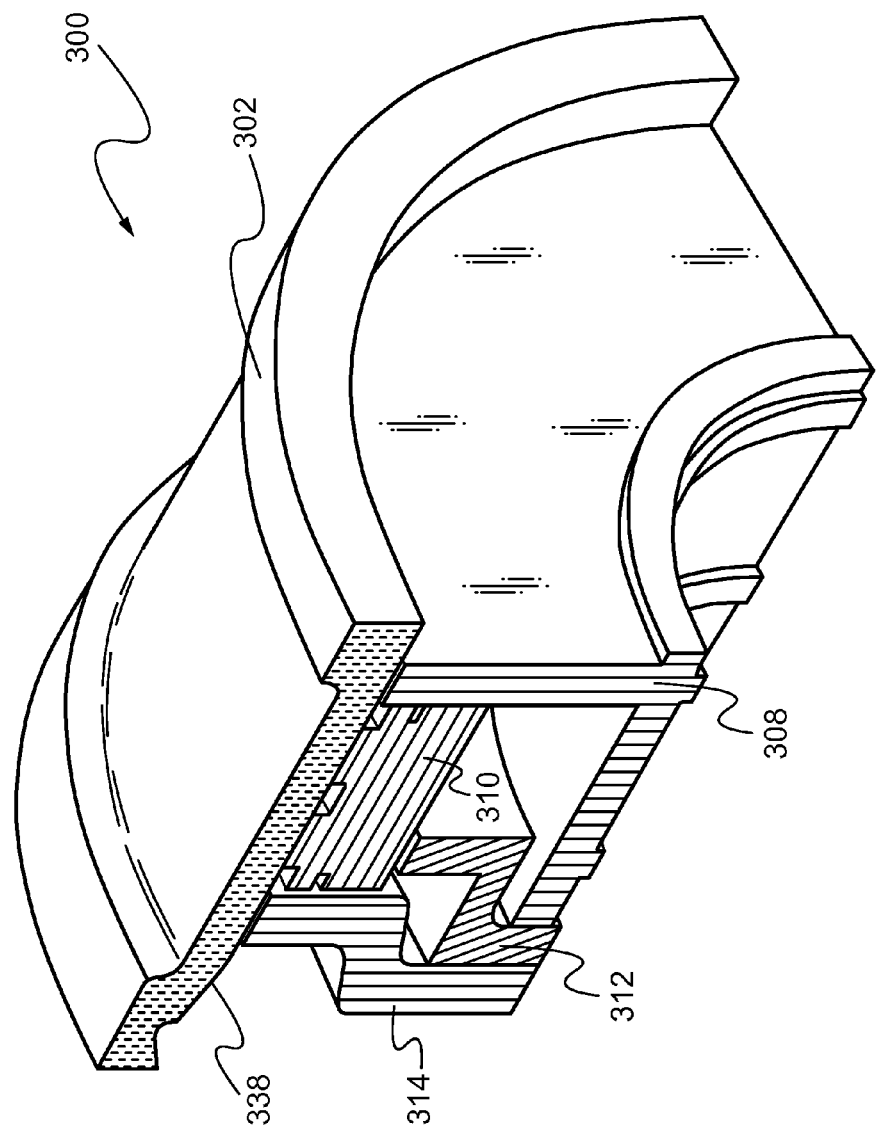
FIG. 5 is a fragmentary perspective view of the seal assembly in FIG. 4 according to the present disclosure.
Figure 6:
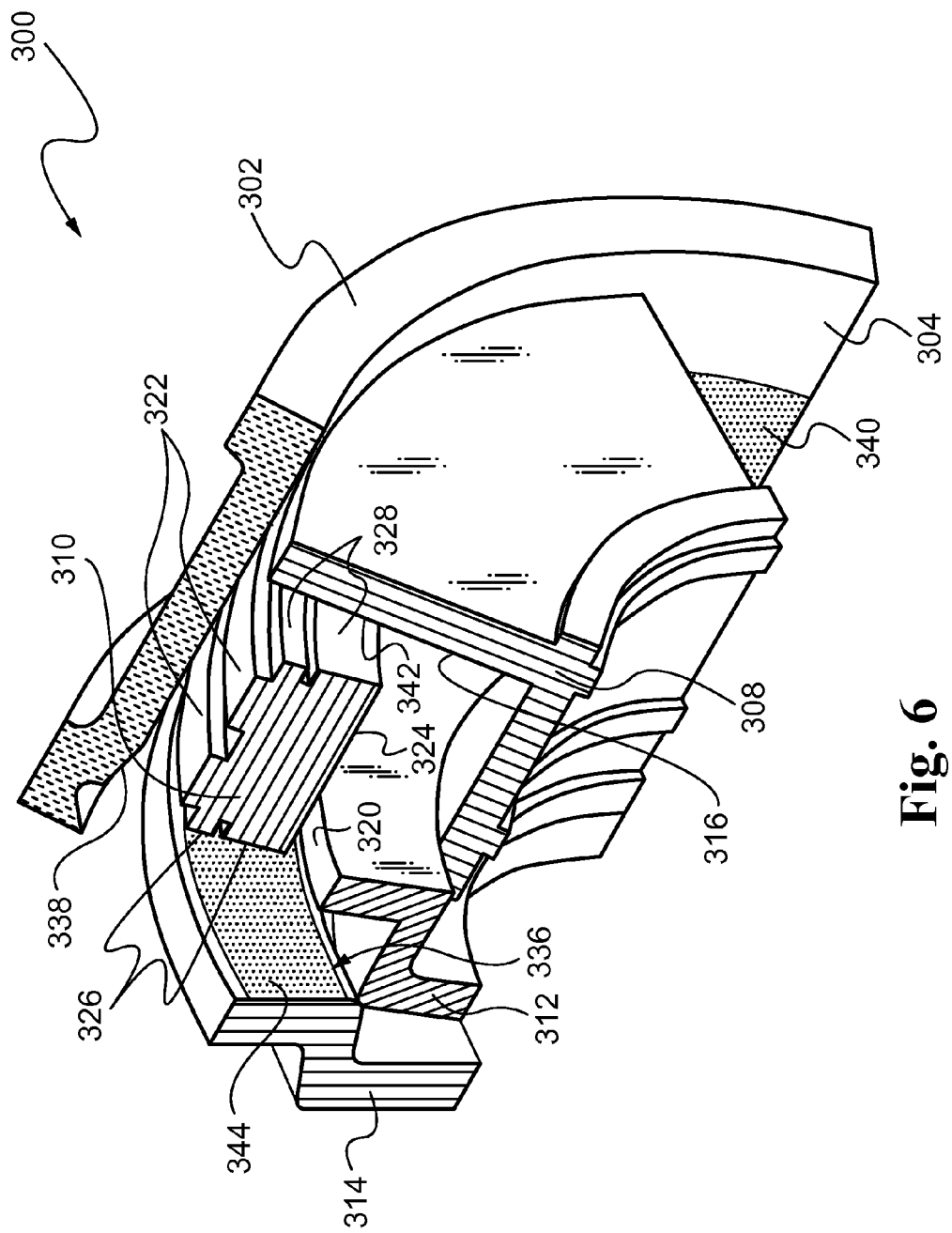
FIG. 6 is another fragmentary perspective view to reveal surfaces of various components of the seal assembly in FIG. 5, according to the present disclosure.

Turning now to FIGS. 5-6, the seal assembly 300 described in FIG. 4 is shown in fragmentary perspective views showing surfaces of some components of the seal assembly 300. Note that components denoted by the same reference numerals have the same functions as those of the components of FIG. 4. The seal assembly 300 may include a spacer 314; a seal plate 308; a ring seal 310; and a ring seal midplate 312. On one hand, the spacer 314, the seal plate 308, and the ring seal midplate 312 may be rotatable with the shaft 306 (not shown). On the other hand, the ring seal 310 may be free, and may be longitudinally located between the spacer 314 and the seal plate 308 and radially spaced between a stationary housing liner 302 and the shaft 306 (not shown). The ring seal midplate 312 may not be attached to the spacer 314 or the seal plate 308 during a hardface process which is applied to any component of the seal assembly, but may locate longitudinally therebetween. A lead-in chamfer 338 may be on the housing 302.

The following describes in more details about the surfaces of the ring seal 310. A seal plate-facing surface 328 of the ring seal 310 may abut the seal plate 308 at a radially extending seal plate region 342 of the seal plate 308 and slidably engage the seal plate 308. The seal plate-facing surface 328 may parallel the seal plate region 342. In addition, a housing liner-facing surface 322 of the ring seal 310 may abut the housing liner 302 at a circumferentially extending housing liner region 340 of the housing liner 302 and slidably engage the housing liner 302. Further, a spacer-facing surface 326 of the ring seal may face a radially extending spacer region 344 of the spacer 314. The spacer-facing surface 326 may parallel the spacer region 344. Finally, a midplate-facing surface 324 of the ring seal 310 may be spaced radially from the ring seal midplate 312 and face the midplate surface 320.

To improve wear resistance, the seal plate region 342 may be hardface coated. Likewise, the housing liner region 340 may be hardface coated. Additionally, the spacer region 344 may be hardface coated as well with a hardface region inner diameter (ID) 336.

The ring seal midplate 312 may be made from materials chosen from any allowable starting materials or a mixture thereof, as long as the part and system design requirements for the seal assembly are met when using the material. The shape and physical dimensions of the ring seal midplate may be varied according to requirements for each specific application. All industry standard engineering parameters for a design can be taken into account. For example, factors which may be considered include, but are not limited to: rotating stack width, hardface and other part tolerances, ring seal element design, and static housing lead-in chamfer design. Furthermore, the geometry design of the ring seal midplate integrates into other rotating stack components in such a way that the critical distortion and/or deflections of the sealing faces on the spacer and/or seal plate are not impacted in a negative manner.

After all hardface processes for the components of the seal assembly 300 are completed, the ring seal midplate 312 may be attached to a part or parts of the seal assembly such as, for example, the seal plate 308 and/or the spacer 314.

It is important to note that the addition of the ring seal midplate does not cause the total weight of the seal assembly to exceed the prescribed range allowable for the proper function of the rotary machine. In addition, the service life of the seal assembly of the present disclosure is increased compared to that of comparable seal assemblies which do not have a seal ring midplate. The performance of a rotary machine comprising the seal assembly of the present disclosure may also be found better than a comparable prior art rotary machine which does not have a ring seal midplate.

INDUSTRIAL APPLICABILITY

The present disclosure solves the paradox of improving the ring seal eccentricity limitation and adopting the preferred geometry for successful hardface coating application. As shown in FIGS. 4-6, all the surfaces which might be hardface coated are not physically connected to or geometrically handicapped by the ring seal midplate, the part which controls the ring seal eccentricity limitation. According to one embodiment of the present disclosure, hardface coatings are separately and successfully performed on the housing liner 302, the seal plate 308, and the spacer 314 before the installation process. On the one hand, no extension features which are attached to the parts to be hardface coated and which would cause quality defects during the spraying are present during the hardface coating process. On the other hand, the geometry of the ring seal midplate can be optimized to provide the best eccentricity control for the ring seal during the installation of the seal assembly.

Consequently, the present disclosure also enables cost and quality metric improvements. Successful applications of hardface coating and improved eccentricity control to the seal assembly lead to improved reliability and service life for sealing parts as well as decreased machine down time due to sealing failures.

Furthermore, the present disclosure improves the overall performance of the rotary machine. A more robust and reliable seal assembly allows low heat generation and less demand for the oil cooling system, which in turn translates into improved thrust specific fuel consumption and better thermal management.

Finally, the present disclosure provides more flexibility in designs of other compartments/systems of the rotary machine. For example, the gapping in or physical space/geometry requirements of the bearing compartment 32 are also directly impacted by the sizing of the extension feature outer diameter of the seal assembly. Accordingly, the present disclosure with ring seal midplate design might benefit the surrounding hardware design of the rotary machine.

While the present disclosure has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A seal assembly for a rotary machine which includes a rotor assembly having a rotatable rotor shaft, the seal assembly being disposed to restrict a leakage of a lubricating fluid from a bearing compartment of the rotary machine and an entry of a hot working medium gas into the bearing compartment, the seal assembly comprising:
    a spacer which is rotatable with the rotor shaft and which extends circumferentially about and radially outward from the rotor shaft;
    a seal plate which is rotatable with the rotor shaft and which extends circumferentially about and radially outward from the rotor shaft, the seal plate including a longitudinally extending leg and a radially outwardly extending leg extending from the longitudinally extending leg;
    a ring seal which is free and which is longitudinally located between the spacer and the seal plate and radially spaced between a stationary housing liner and the rotor shaft, a seal plate-facing surface of the ring seal abutting the seal plate at a radially extending seal plate region of the seal plate and slidably engaging the seal plate, a housing liner-facing surface of the ring seal abutting the stationary housing liner at a circumferentially extending housing liner region of the stationary housing liner and in slidable or static engagement with the stationary housing liner; and
    a ring seal midplate which is rotatable with the rotor shaft and which extends circumferentially about and radially outward from the rotor shaft, wherein the ring seal midplate is not attached to the spacer or the seal plate during a hardface process which is applied to any component of the seal assembly, and wherein the ring seal midplate is longitudinally located between the spacer and the longitudinally extending leg of the seal plate and radially spaced between the ring seal and the rotor shaft.

2. The seal assembly of claim 1, wherein the seal plate region is hardface coated.

3. The seal assembly of claim 2, wherein the seal plate is hardface coated before being attached to the rotor shaft.

4. The seal assembly of claim 1, wherein the seal plate-facing surface parallels the seal plate region.

5. The seal assembly of claim 1, wherein the circumferentially extending housing liner region is hardface coated.

6. The seal assembly of claim 5, wherein the stationary housing liner is hardface coated before being attached to the bearing compartment.

7. The seal assembly of claim 1, wherein a spacer-facing surface of the ring seal faces a radially extending spacer region of the spacer, and wherein the radially extending spacer region is hardface coated.

8. The seal assembly of claim 7, wherein the spacer is hardface coated before being attached to the rotor shaft.

9. The seal assembly of claim 7, wherein the spacer-facing surface parallels the spacer region.

10. The seal assembly of claim 7, wherein there is a circumferentially extending cavity between the spacer-facing surface and the spacer region.

11. The seal assembly of claim 1, wherein the rotor shaft has a centerline, and wherein the ring seal midplate has an outer diameter which sets an allowable eccentricity of the ring seal with respect to the centerline during installation of the seal assembly.

12. The seal assembly of claim 1, wherein the ring seal is a graphitic carbon or metallic material.

13. The seal assembly of claim 1, wherein after the hardface process for components of the seal assembly is completed, the ring seal midplate is attached to at least a part of the seal assembly, the part of the seal assembly comprising the seal plate and the spacer.

14. A rotary machine which includes a rotor assembly having a rotatable rotor shaft, and a seal assembly to restrict a leakage of a lubricating fluid from a bearing compartment of the rotary machine and an entry of a hot working medium gas into the bearing compartment, wherein the seal assembly comprising:
   a spacer which is rotatable with the rotor shaft and which extends circumferentially about and radially outward from the rotor shaft;
   a seal plate which is rotatable with the rotor shaft and which extends circumferentially about and radially outward from the rotor shaft, the seal plate including a longitudinally extending leg and a radially outwardly extending leg extending from the longitudinally extending leg;
   a ring seal which is free and which is longitudinally located between the spacer and the seal plate and radially spaced between a stationary housing liner and the rotor shaft, a seal plate-facing surface of the ring seal abutting the seal plate at a radially extending seal plate region of the seal plate and slidably engaging the seal plate, a housing liner-facing surface of the ring seal abutting the stationary housing liner at a circumferentially extending housing liner region of the stationary housing liner and in slidable or static engagement with the stationary housing liner; and
   a ring seal midplate which is rotatable with the rotor shaft and which extends circumferentially about and radially outward from the rotor shaft, wherein the ring seal midplate is not attached to the spacer or the seal plate during a hardface process which is applied to any component of the seal assembly, and wherein the ring seal midplate is longitudinally located between the spacer and the longitudinally extending leg of the seal plate and radially spaced between the ring seal and the rotor shaft.

15. The rotary machine of claim 14, wherein the seal plate region is hardface coated.

16. The rotary machine of claim 15, wherein the seal plate is hardface coated before being attached to the rotor shaft.

17. The rotary machine of claim 14, wherein the circumferentially extending housing liner region is hardface coated.

18. The rotary machine of claim 17, wherein the stationary housing liner is hardface coated before being attached to the bearing compartment.

19. The rotary machine of claim 14, wherein a spacer-facing surface of the ring seal faces a radially extending spacer region of the spacer, and wherein the radially extending spacer region is hardface coated.

20. The rotary machine of claim 19, wherein the spacer is hardface coated before being attached to the shaft.

* * * * *